United States Patent
Hosaka et al.

(10) Patent No.: US 8,029,075 B2
(45) Date of Patent: Oct. 4, 2011

(54) BRAKE CONTROL APPARATUS AND PROCESS

(75) Inventors: Motoaki Hosaka, Ebina (JP); Tatsuya Suzuki, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 550 days.

(21) Appl. No.: 12/246,712

(22) Filed: Oct. 7, 2008

(65) Prior Publication Data

US 2009/0096279 A1    Apr. 16, 2009

(30) Foreign Application Priority Data

Oct. 11, 2007 (JP) .................................. 2007-265082
Jun. 18, 2008 (JP) .................................. 2008-158593

(51) Int. Cl.
*B60T 8/60* (2006.01)
(52) U.S. Cl. ..................... 303/155; 303/116.1; 701/78
(58) Field of Classification Search .................. 303/10, 303/11, 113.1, 116.1, 119.1, 155, 160, 166; 701/70, 71, 74, 75, 78
See application file for complete search history.

(56) References Cited

U.S. PATENT DOCUMENTS

2010/0222978 A1* 9/2010 Kodama et al. ............... 701/70

FOREIGN PATENT DOCUMENTS

EP    0 928 730 A1    7/1999
JP    11-020638 A    1/1999

* cited by examiner

Primary Examiner — Thomas J Williams
(74) Attorney, Agent, or Firm — Foley & Lardner LLP

(57) ABSTRACT

A brake control apparatus includes a fluid pressure sensor to sense an actual master cylinder pressure, a pump to suck a brake fluid from the master cylinder through a hydraulic circuit connecting the master cylinder to a wheel cylinder and a controller to perform a brake assist control to supply a discharge pressure of the pump to the wheel cylinder in accordance with the sensed actual master cylinder pressure signal. The controller calculates a modified master cylinder pressure by modifying the actual master cylinder pressure in accordance with an operating condition of the pump, calculates a base pressure in accordance with a variation of the modified master cylinder pressure, and calculates a target wheel cylinder pressure in accordance with the base pressure, to control a braking force by controlling an actual wheel cylinder pressure of the wheel cylinder in accordance with the target wheel cylinder pressure.

17 Claims, 11 Drawing Sheets

BRAKE CONTROL APPARATUS AND PROCESS

BACKGROUND OF THE INVENTION

The present invention relates to apparatus and/or process for controlling a braking force for brake assistance.

A brake assist control system is arranged to produce a braking force greater than a braking force corresponding to a driver's brake operation, by supplying, to a wheel cylinder, a brake fluid sucked from a master cylinder with a pump. During the brake assist control, the brake fluid is drained from the master cylinder by the pump, and hence the output signal of a fluid pressure sensor for sensing the master cylinder pressure does not represent a driver's brake operation quantity properly. Therefore, a driver's brake operation quantity can not be reflected adequately in a target wheel cylinder pressure in a braking force control system setting the target wheel cylinder pressure from the sensor signal of the fluid pressure sensor without using a brake stroke sensor for sensing a driver's brake operation quantity directly.

Therefore, in order to reflect a driver's brake operation in a brake assist control, a braking force control system proposed in a Published Japanese Patent Specification Publication No. 11-20638 is arranged to modify the output signal of a fluid pressure sensor with a correction quantity corresponding to a decrease of the master cylinder pressure (represented by the output signal) not attributable to the driver's brake operation.

SUMMARY OF THE INVENTION

When the pump is operated to control the braking force independently of the driver's operation, the pump operation tends to produce pulsation in the master cylinder pressure. However, the braking force control system of the above-mentioned Japanese patent document give no consideration to such pulsation.

When pulsation is produced by the operation of the pump during the brake assist control, the target braking force is fluctuated by the pulsation, and this fluctuation causes an unstable braking force and an undesired feeling.

Therefore, it is an object of the present invention to provide brake control apparatus and/or process to prevent fluctuation in a wheel cylinder pressure due to pump operation, and to provide stable braking performance.

According to one aspect of the present invention, a brake control apparatus comprises a fluid pressure sensor to produce a sensor signal representing an actual master cylinder pressure of a master cylinder; a pump to suck a brake fluid from the master cylinder through a hydraulic circuit connecting the master cylinder to a wheel cylinder; and a controller to perform a brake assist control to supply a discharge pressure of the pump to the wheel cylinder and to return the brake fluid from the wheel cylinder to the master cylinder through the hydraulic circuit, in accordance with the sensor signal. The controller calculates a modified master cylinder pressure by modifying the actual master cylinder pressure in accordance with an operating condition of the pump; calculates a base pressure representing a driver's brake operation quantity, in accordance with a variation of the modified master cylinder pressure; and calculates a target wheel cylinder pressure in accordance with the base pressure, to control a braking force by controlling an actual wheel cylinder pressure of the wheel cylinder in accordance with the target wheel cylinder pressure.

The controller may be configured to calculate an estimated (secondary) master cylinder pressure variation due to a pump operation in accordance with the operating condition (such as the discharge quantity) of the pump; to calculate the modified master cylinder pressure by modifying the actual master cylinder pressure with a modification quantity corresponding to the estimated (secondary) master cylinder pressure variation due to the pump operation; to calculate the base pressure representing the driver's brake operation quantity in accordance with the actual master cylinder pressure at the time of a start of the brake assist control and the time variation of the modified master cylinder pressure; to calculate the target wheel cylinder pressure in accordance with the base pressure; and to control the braking force by controlling the actual wheel cylinder pressure of the wheel cylinder (by driving the pump) in accordance with the target wheel cylinder pressure.

DETAILED DESCRIPTION OF THE INVENTION

Figure 1:
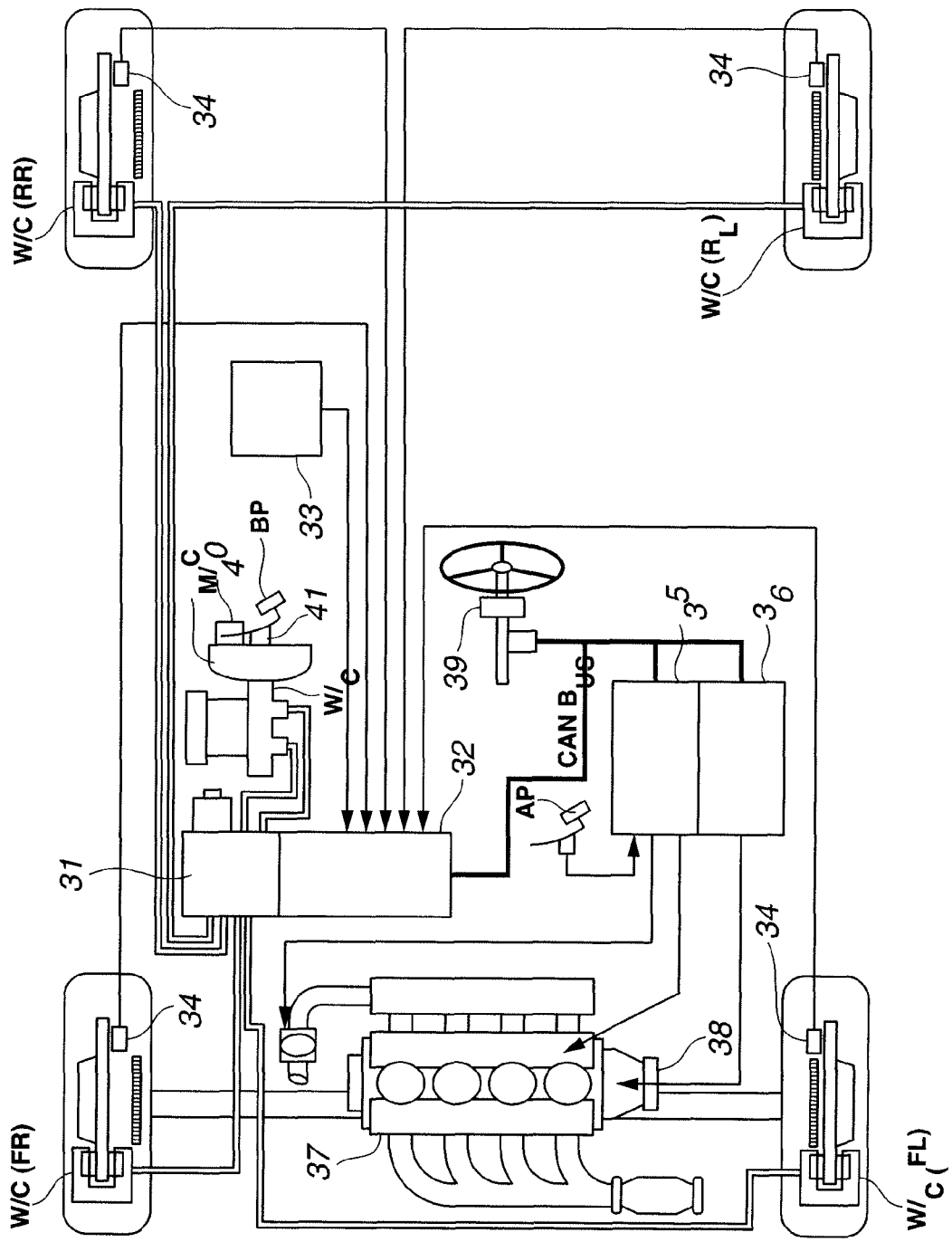
FIG. 1 is a schematic view showing a vehicle equipped with a brake control system according to a first embodiment of the present invention.

FIG. 1 schematically shows a vehicle equipped with a brake control system (or apparatus) according to a first embodiment of the present invention. A hydraulic unit (HU) (or hydraulic modulator) 31 controls the wheel cylinder pressure of each of wheel cylinders W/C for front left wheel (FL), rear right wheel (RR), front right wheel (FR) and rear left wheel (RL) in pressure hold mode, pressure increase mode and pressure decrease mode under the control of a brake controller (brake ECU) 32.

Brake ECU 32 collects input information on vehicle operating conditions from various sensors and other devices, determines whether to perform a brake control, and controls the hydraulic unit (HU) 31 to hold, increase or decrease the wheel cylinder pressure of each wheel cylinder, in accordance with the input information. In this example, through a CAN communication system, brake ECU 32 receives information from a vehicle behavior sensor 33 for sensing a vehicle yaw rate and a vehicle lateral acceleration, wheel speed sensors 34 for sensing the wheel speeds of the four wheels of the vehicle, an engine controller (ENGCU) 35, and an automatic transmission controller (ATCU) 36. Brake ECU 32 further receives information from a steering angle sensor 39 for sensing a steering wheel angle. In accordance with the information received from these sensors and controllers, brake ECU 32 controls the wheel cylinder pressures.

A brake pedal BP is an input device operated by the driver to brake the vehicle. An electric brake booster 41 amplifies a driver's brake pedal operation quantity applied to brake pedal BP with a predetermined boost ratio. The brake input amplified by brake booster 41 is converted to a fluid pressure by a master cylinder M/C. The fluid pressure thus produced by master cylinder M/C is supplied through HU 31 to each wheel cylinder W/C to brake a corresponding one of the four wheels of the vehicle.

An accelerator pedal AP is an input device operated by the driver to accelerate the vehicle. In accordance with a driver's accelerator operation, ENGCU 35 controls an engine 37 of the vehicle. Moreover, ENGCU 35 delivers information on the torque produced by engine 37 and the driver's accelerator pedal operation quantity through communication (CAN). ATCU 36 controls an automatic transmission 38 of the vehicle. Moreover, ATCU 36 delivers information on the gear position signal (the range position of automatic transmission 38) through communication (CAN).

Figure 2:
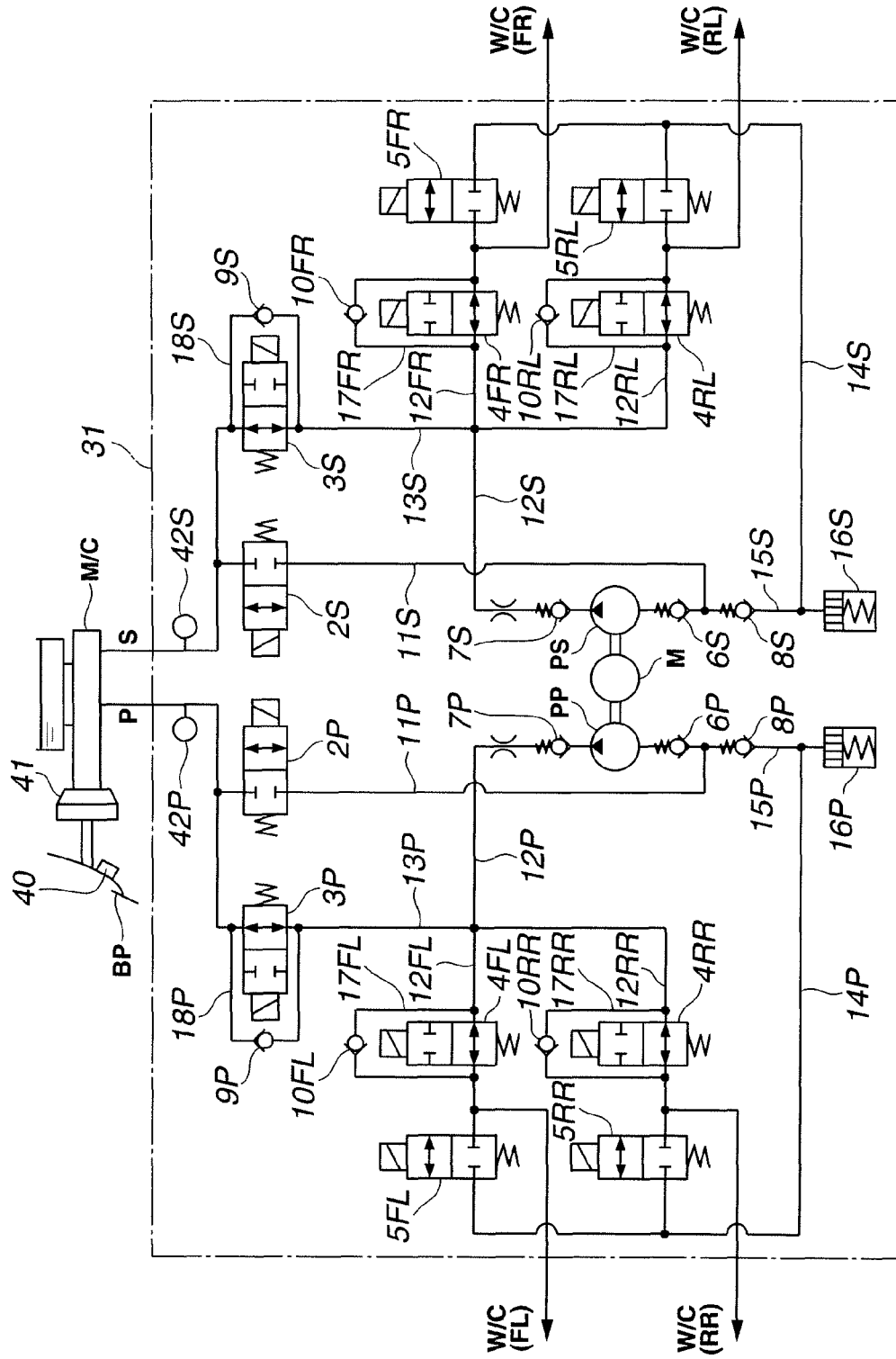
FIG. 2 is a hydraulic circuit diagram showing a hydraulic unit (HU) 31 shown in FIG. 1.

FIG. 2 shows the hydraulic circuit of HU 31 employed in the brake system of FIG. 1. HU 31 includes a P system and an S system, and has a piping arrangement called an X-piping. The P system is connected to the wheel cylinder W/C(FL) for the front left wheel and the wheel cylinder W/C(RR) for the rear right wheel, whereas the S system is connected to the wheel cylinder W/C(FR) for the front right wheel and the wheel cylinder W/C(RL) for the rear left wheel. Each of the P and S systems includes a pump PP or PS. The pumps PP and PS of the P and S systems are driven by a single common motor M. The pumps may be plunger pumps, gear pumps or pumps of other known types. The plunger pump is desirable in view of the cost, and the gear pump is desirable in the smoothness (controllability).

In each of the P side and S side, the master cylinder M/C is connected with the inlet (suction) side of pump P (PP or PS) by a fluid passage 11 (11P or 11S). In this fluid passage 11 (11P or 11S), there is provided a gate-in valve 2 (2P or 2S) which is a normally closed electromagnetic valve.

In the fluid passage 11, between pump P and gate-in valve 2, there is provided a check valve 6 (6P or 6S) arranged to allow the brake fluid flow in the direction from gate-in valve 2 to pump P and to prevent the flow in the opposite direction.

The outlet (discharge) side of pump P of each of the P and S systems is connected with each of the wheel cylinders connected with the P or S system by a fluid passage 12 (12P or 12S). The fluid passage 12P of the P system branches off at a branch point into two passages (branches) 12FL and 12RR provided, respectively, with normally open solenoid valves 4FL and 4RR for the wheel cylinders W/C(FL, RR). The fluid passage 12S of the S system branches off at a branch point into two passages (branches) 12FR and 12RL provided, respectively, with normally open solenoid valves 4FR and 4RL for the wheel cylinders W/C(FR, RL). These solenoid valves 4FL, 4RR, 4FR and 4RL are called solenoid-in valves or pressure increase control valves.

In the fluid passage 12 on each side, between the pump P and the branch point, there is provided a check valve 7 (7P or 7S) which is arranged to allow the fluid flow in the direction from pump P toward the solenoid-in valves 4, and to prevent the fluid flow in the opposite direction.

Each of the branch passages 12 (12FL, 12RR, 12FR and 12RL) is provided with a bypass passage 17 (17FL, 17RR, 17FR or 17RL) bypassing the corresponding gate-in valve 4, and a check valve 10 (10FL, 10RR, 10FR or 10RL) is provided in each bypass passage 12. The check valve 10 in each bypass passage 12 is arranged to allow the fluid flow in the direction from the wheel cylinder to the pump P and to prevent the fluid flow in the opposite direction.

Master cylinder M/C is connected with the fluid passage 12 (12P or 12S) by a fluid passage 13 (13P or 13S). The fluid passages 12 and 13 are joined together at the branch point between the pump P and the solenoid-in valves 4. There is provided, in the fluid passage 13, a gate-out valve 3 (3P or 3S) which is a normally open electromagnetic valve.

Each of the fluid passages 13 (13P and 13S) is provided with a bypass passage 18 (18P or 18S) bypassing the corresponding gate-out valve 3, and a check valve 9 (9P or 9S) is provided in each bypass passage 18. The check valve 9 in each bypass passage 18 is arranged to allow the fluid flow in the direction from master cylinder M/C toward the wheel cylinders and to prevent the fluid flow in the opposite direction.

A reservoir 16 (16P or 16S) is provided on the inlet side of the pump P, and connected with pump P by a fluid passage 15 (15P or 15S). Between reservoir 16 and pump P, there is provided a check valve 8 (8P or 8S) to allow the fluid flow from reservoir 16 to pump P and to prevent the fluid flow in the opposite direction.

The fluid passage 15 is connected with the wheel cylinders by a fluid passage 14 (14P or 14S). The fluid passage 14 is joined with the fluid passage 15 at the point between the check valve 8 and reservoir 16. In the fluid passage 14, there are provided solenoid-out valves (pressure decrease control valves) 5 (5FL and 5RR or 5FR and 5RL) which are normally closed electromagnetic valves.

A master cylinder pressure sensor 42 (42P or 42S) is provided in the fluid passage between master cylinder M/C and gate valves 3 (3P or 3S) and 2 (2P or 2S). Master cylinder pressure sensor 42 serves as a fluid pressure sensor to produce a pressure signal or sensor signal representing the sensed actual master cylinder pressure.

In accordance with input signals from various sensors, brake ECU 32 performs operations for a normal brake control based on a driver's brake operation, an anti-skid brake control (ABS), and vehicle behavior control such as vehicle dynamics control (VDC), calculates a desired target brake force required by the vehicle, and controls the wheel cylinder pressure of each wheel cylinder.

Moreover, brake ECU 32 performs a brake assist control to produce a braking force greater than a braking force corresponding to a driver's brake operation. In this embodiment, the brake assist control is in the form of a buildup control simulating a buildup characteristic of a brake pad. The following explanation is directed to the buildup control.

Automotive vehicles uses brake pads to brake road wheels. When a continuous braking operation is performed by holding a brake pedal depression force (or a brake operation quantity or brake pedal depression degree or a depression pressure) constant, this continuous braking operation causes an increase in the temperature of a brake pad, and an increase of the friction coefficient, so that the braking force is increased gradually. This phenomenon of the gradual increase of the braking force is called a buildup characteristic of a brake pad. This buildup characteristic is greatly dependent on the material of the brake pad.

Therefore, a brake system of earlier technology is designed to achieve a desired buildup characteristic by selecting the material of the brake pad having desired properties. Furthermore, there is a proposal to produce a desired buildup characteristic with a braking force control without being influenced by the characteristic of the brake pad material or in addition to the characteristic due to the brake pad material.

In the illustrated example of the first embodiment, the control system increases the wheel cylinder pressure gradually by increasing a target deceleration with time and thereby ensure the feeling of an increase of the braking effect at the later stage of the braking when the operating speed of brake pedal BP is within a predetermined range, that is when the output signal of master cylinder pressure sensor 42 is within a predetermined range. This buildup control is terminated when the vehicle speed becomes equal to a predetermined low speed threshold value.

Figure 3:
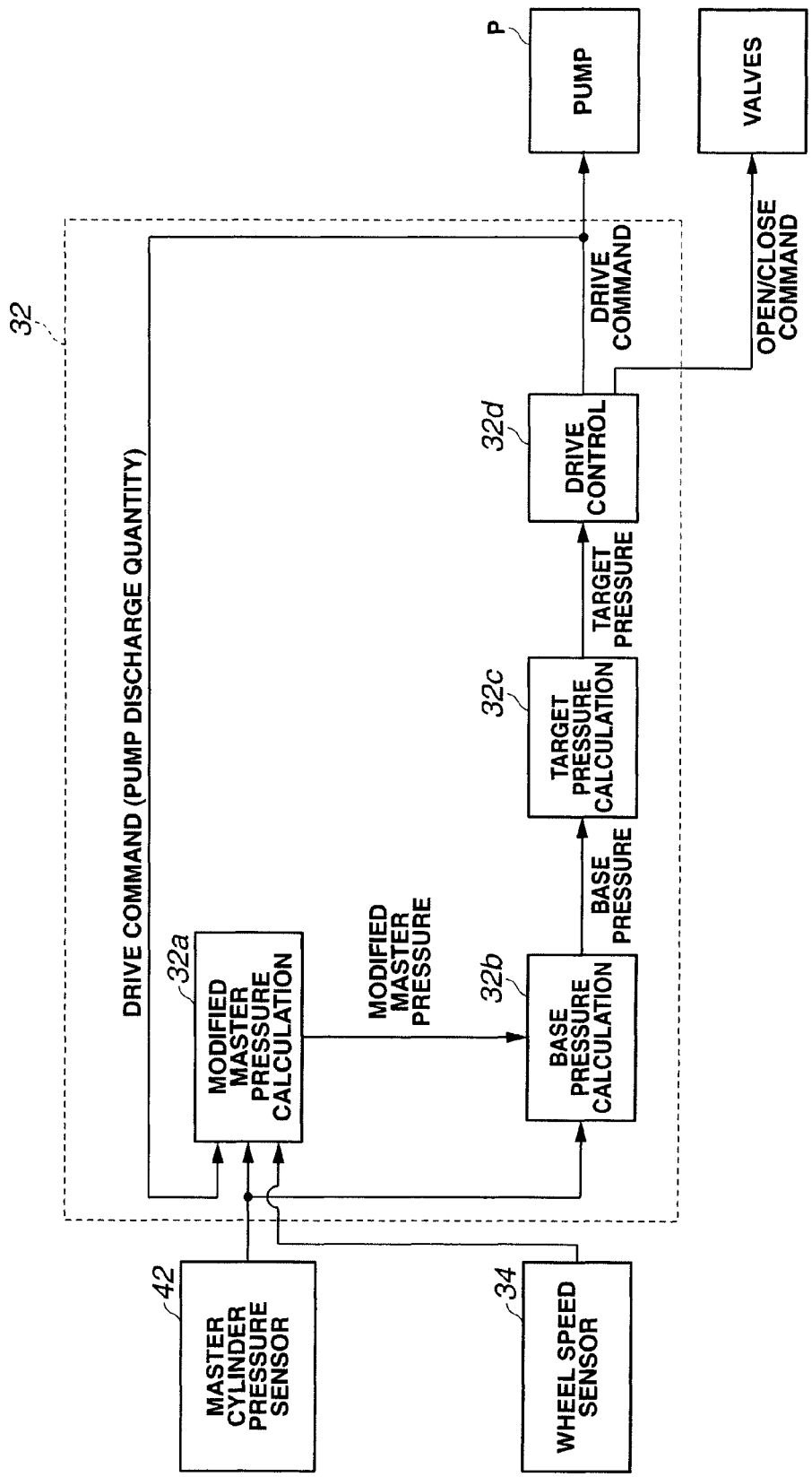
FIG. 3 is a block diagram showing a buildup control system formed by a brake ECU 32 shown in FIG. 1.

FIG. 3 shows the structure of brake ECU 32 as a controller of a buildup control system (and as a component serving as a brake assist controlling means).

A modified (or estimated) master cylinder pressure calculating section 32a (which can serve as a modified (or estimated) master cylinder pressure calculating means) shown in FIG. 3 is configured to calculate an estimated master cylinder pressure variation in accordance with a pump discharge quantity (or pressure increase quantity) of pump P, and to calculate a modified master cylinder pressure in accordance with the estimated master cylinder pressure variation and the actual master cylinder pressure represented by the sensor signal of master cylinder pressure sensor 42. The modified master cylinder pressure is an estimated master cylinder pressure so modified as to eliminate the influence of pump P.

A base pressure calculating section 32b (which can serve as base pressure calculating means) is configured to calculate a base pressure in accordance with the actual master cylinder pressure at the time of a start of the brake assist control and a variation (or variation quantity) of the modified master cylinder pressure calculated by modified master cylinder pressure calculating section 32a. The base pressure is used as an estimated master cylinder pressure representing the driver's brake operation quantity.

A target wheel cylinder pressure calculating section 32c (which can serve as target pressure calculating means) is configured to calculate a target wheel cylinder pressure in accordance with the base pressure calculated by section 32b. A drive control section 32d controls the pump P in accordance with the target wheel cylinder pressure calculated by section 32c, by sending the drive 4 command to pump P. At the same time, drive control section 32d controls the gate valves 2 and 3 by delivering open/close commands.

When the wheel cylinder pressure is to be increased by driving pump P during the brake assist (buildup) control, the ECU 32 opens the gate-in valve 2 from the normal state shown in FIG. 2, sucks the brake fluid of master cylinder M/C through fluid passage 11 with pump P and supplies the brake fluid through fluid passage 12 to the wheel cylinder W/C. At the same time, the ECU 32 closes the gate-out valve 3 to prevent the brake fluid from returning from the wheel cylinder W/C to the master cylinder M/C through passage 13. When, on the other hand, the wheel cylinder pressure is to be decreased during the buildup control, ECU 32 stops the pump P, closes gate-in valve 2, opens gate-out valve 3, and thereby returns the brake fluid from wheel cylinder W/C to master cylinder M/C through fluid passage 13.

Figure 4:
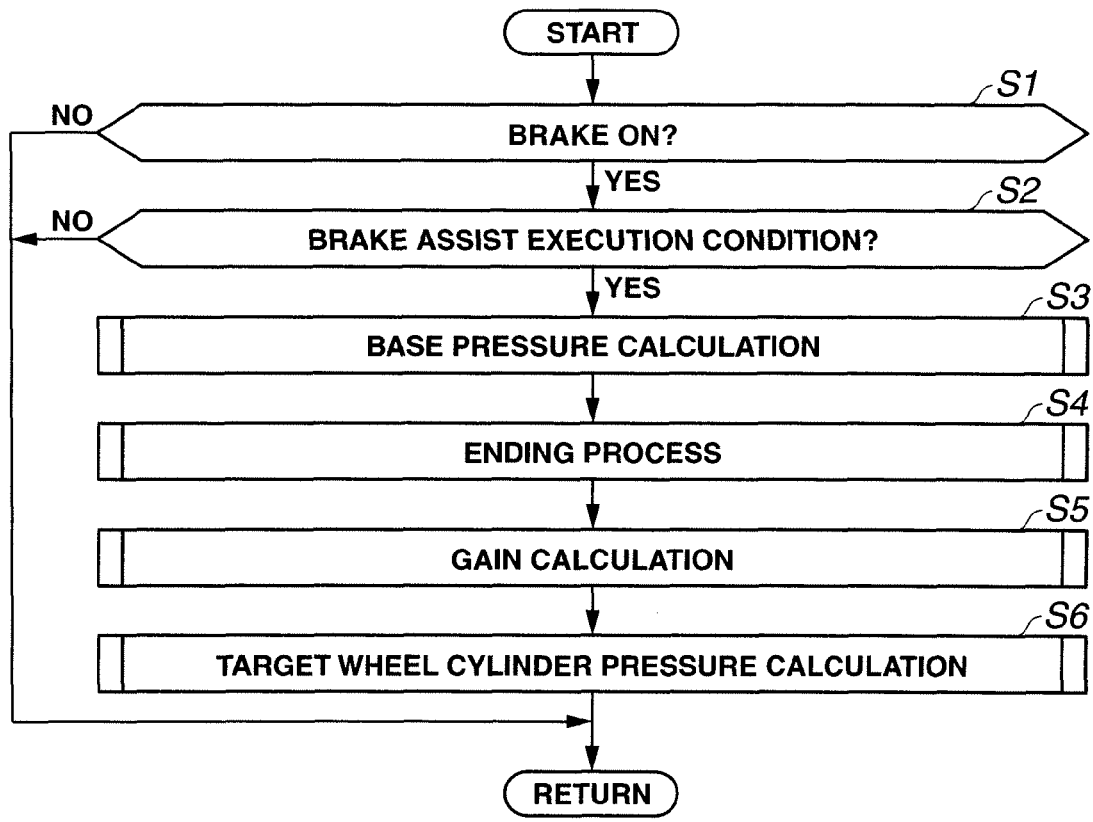
FIG. 4 is a flowchart showing a brake assist control process performed by the brake ECU 32.

[Brake Assist Control] FIG. 4 shows the brake assist control process performed by brake ECU 32 at regular time intervals of a predetermined control cycle (time).

At a step S1, ECU 32 (in modified master pressure calculating section 32a) examines whether brake pedal BP is depressed by the driver or not, by examining the actual master cylinder pressure sensed by master cylinder pressure sensor 42. ECU 32 proceeds to a step S2 in the case of YES, and proceeds to the end (RETURN) of the process of FIG. 4 in the case of NO.

At step S2, ECU 32 (in modified master pressure calculating section 32a) examines whether a predetermined brake assist execution condition is satisfied or not, From S2, ECU 32 proceeds to a step S3 in the case of YES, and to the end (RETURN) of the process of FIG. 4. In this examples when the actual master cylinder pressure remains in a predetermined range, the ECU 32 judges that the driver is depressing the brake pedal constantly, and the brake assist execution condition is satisfied.

At step S3, ECU 32 (in modified master pressure calculating section 32a and base pressure calculating section 32b) performs a base pressure calculating process shown in FIG. 5, as mentioned later. After S3, ECU 32 proceeds to a step S4.

At step S4, ECU 32 (in base pressure calculating section 32b) performs an ending process shown in FIG. 7 as mentioned later. After S4, ECU 32 proceeds to a step S5.

At step S5, ECU 32 (in target pressure calculating section 32c) performs a gain calculating process shown in FIG. 8 as mentioned later. After S5, ECU 32 proceeds to a step S6.

At step S6, ECU 32 (in target pressure calculating section 32c) performs a target wheel cylinder pressure calculating process shown in FIG. 9 as mentioned later. After S6, ECU 32 terminates the process of FIG. 4 by proceeding to the end (RETURN).

Figure 5:
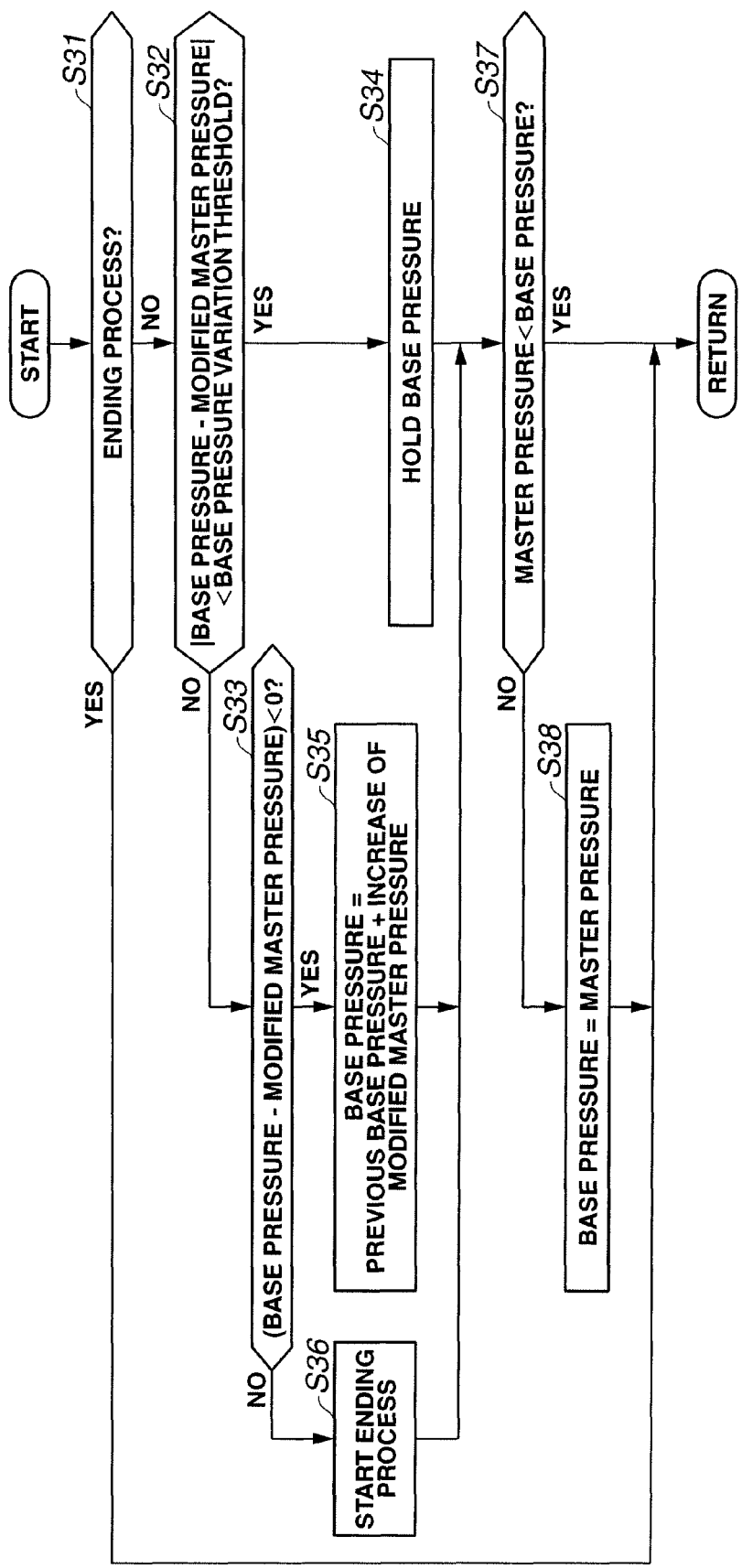
FIG. 5 is a flowchart showing a base pressure calculating process performed in a modified master pressure calculating section 32a and a base pressure calculating section 32b shown in FIG. 3.

[Base Pressure Calculation] FIG. 5 is a flowchart showing a control flow of a base pressure calculating process performed in modified (or estimated) master cylinder pressure calculating section 32a and base pressure calculating section 32b according to the first embodiment.

At a step S31, ECU 32 examines whether the ending process (shown in FIG. 7) is in progress or not, by examining whether an end (control) flag is set or not. ECU 32 terminates the process of FIG. 5 in the case of YES, and proceeds from S31 to a step S32 in the case of NO.

At step S32, ECU 32 calculates the modified (or estimated) master cylinder pressure in modified master pressure calculating section 32a, and checks a deviation between the calculated modified master cylinder pressure and the base pressure calculated in a previous control calculating cycle, in base pressure calculating section 32b. At S32, ECU 32 compares an absolute value of the deviation (|base pressure−modified pressure|) with a predetermined base pressure variation threshold, and determines whether the absolute value of the deviation (between the current modified master cylinder pressure calculated in the current control cycle and the previous base pressure calculated in the previous control cycle) is smaller than the base pressure variation threshold. From S32, ECU 32 proceeds to a step S34 in the case of YES, and to a step S33 in the case of NO. The base pressure variation threshold is determined in accordance with a variation of the modified master pressure due to pulsation of pump P. In this example, the base pressure variation threshold is set equal to a value greater than the variation of the modified master pressure due to the pulsation of pump P.

Figure 6:
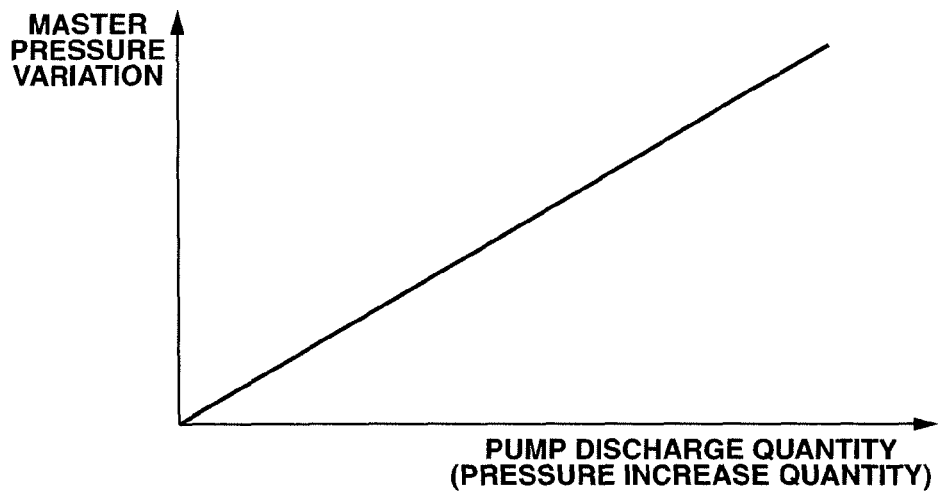
FIG. 6 is a graphic view showing a map to determine an estimated master cylinder pressure variation from a pump discharge quantity (or a pump pressure increase quantity).

The modified master cylinder pressure is calculated from the actual master cylinder pressure sensed by master cylinder pressure sensor 42 and an estimated (secondary or unintended) master cylinder pressure variation due to the pump operation. The estimated (secondary or unintended) master pressure variation due to the pump operation is determined from the pump drive command supplied from drive control section 32d to pump P, in this example. That is, ECU 32 calculates a discharge quantity (or pressure increase quantity) of pump P from the drive command to pump P, and calculates the estimated (secondary or unintended) master cylinder pressure variation (quantity) from the calculated pump discharge quantity, by using a map shown in FIG. 6. Then, ECU 32 calculates the modified master cylinder pressure by addition of the estimated (secondary or unintended) master cylinder pressure variation and the actual master cylinder pressure.

[modified master cylinder pressure]=[actual master cylinder pressure]+[estimated master cylinder pressure variation (pump pressure increase)]

Thus, the modified master cylinder pressure is determined by modifying the actual master cylinder pressure sensed by master cylinder pressure sensor 42, with a modification quantity for compensating for an unintended master cylinder pressure variation (or decrease) caused by the pump P sucking the brake fluid from the master cylinder, without regard to the intention of the driver. The modified master cylinder pressure is equal to the sum of the actual master cylinder pressure and the modification quantity determined from the estimated (secondary or unintended) master cylinder pressure variation due to the pump operation. In this example, the modification quantity is set equal to (the absolute value of) the estimated (secondary or unintended) master cylinder pressure variation due to the pump operation. Therefore, even if the actual master cylinder pressure is decreased by the effect of the operation of pump P, the modified master cylinder pressure remains constant as long as the brake pedal depression is constant.

At step S33, ECU 32 examines whether a difference obtained by subtracting the (current) modified master cylinder pressure from the (previous) base pressure is negative or not. From S33, ECU proceeds to a step S35 in the case of YES (the (current) modified master cylinder pressure is higher than the (previous) base pressure), and to a step S36 in the case of NO (the (current) modified master cylinder pressure is lower than or equal to the (previous) base pressure).

At step S34, ECU 32 sets the base pressure to a previous value of the base pressure calculated in the previous control cycle (previous base pressure). Then, ECU 32 proceeds to a step S37. Thus, ECU 32 holds the base pressure unchanged unless the deviation between the base pressure and the modified master cylinder pressure exceeds the base pressure variation threshold.

At step S35, in base pressure calculating section 32b, ECU 32 calculates a modified master cylinder pressure variation (increase) from a difference between the modified master cylinder pressure calculated at S32 (current modified master cylinder pressure) and a previous value of the modified master cylinder pressure calculated in the previous control cycle (previous modified master cylinder pressure), and calculates the base pressure by adding the modified master cylinder pressure variation to the base pressure (previous base pressure) calculated in the previous control cycle.

[base pressure]=[previous base pressure]+[modified master cylinder pressure variation]

The previous base pressure is the previous value of the base pressure, which is initially set to an initial value. In this example, the initial value of the previous base pressure is equal to the actual master cylinder pressure sensed at the time of start of the brake assist control. When the actual master cylinder pressure is increased and hence the modified master cylinder pressure is increased by the amount exceeding the base pressure variation threshold of S32, then ECU 32 increases the base pressure in accordance with the time variation of the modified master cylinder pressure (that is, the current modified master cylinder pressure calculated in the current control cycle minus the previous modified master cylinder pressure calculated in the previous control cycle, in this example), or at the time rate of increase of the modified master cylinder pressure.

At step S36, ECU 32 sets the end (control) flag, in base pressure calculating section 32b, to start the ending process, and then proceeds to step S37. When the actual master cylinder pressure is decreased and hence the modified master cylinder pressure is decreased by the amount exceeding the base pressure variation threshold of S32, then ECU 32 sets the end flag to one, and starts the ending process of FIG. 7.

At S37, ECU 32 compares the base pressure with the actual master cylinder pressure to determine whether the actual master cylinder pressure is lower than the base pressure or not. ECU 32 terminates the process of FIG. 5 in the case of YES, and proceeds from S37 to a step S38 in the case of NO. At S38, ECU 32 sets the base pressure to the actual master cylinder pressure, and then terminates the process of FIG. 5. Thus, the base pressure is set equal to the actual master cylinder pressure if the base pressure is lower than the actual master cylinder pressure.

The base pressure calculating process of FIG. 5 is designed to determine the base pressure from the base pressure and the actual master pressure by a select-high operation, in order to prevent the target pressure from becoming lower than the actual master cylinder pressure even when the base pressure deviates from the value corresponding to the actual master cylinder pressure because of sensor noises or some other factors.

Figure 7:
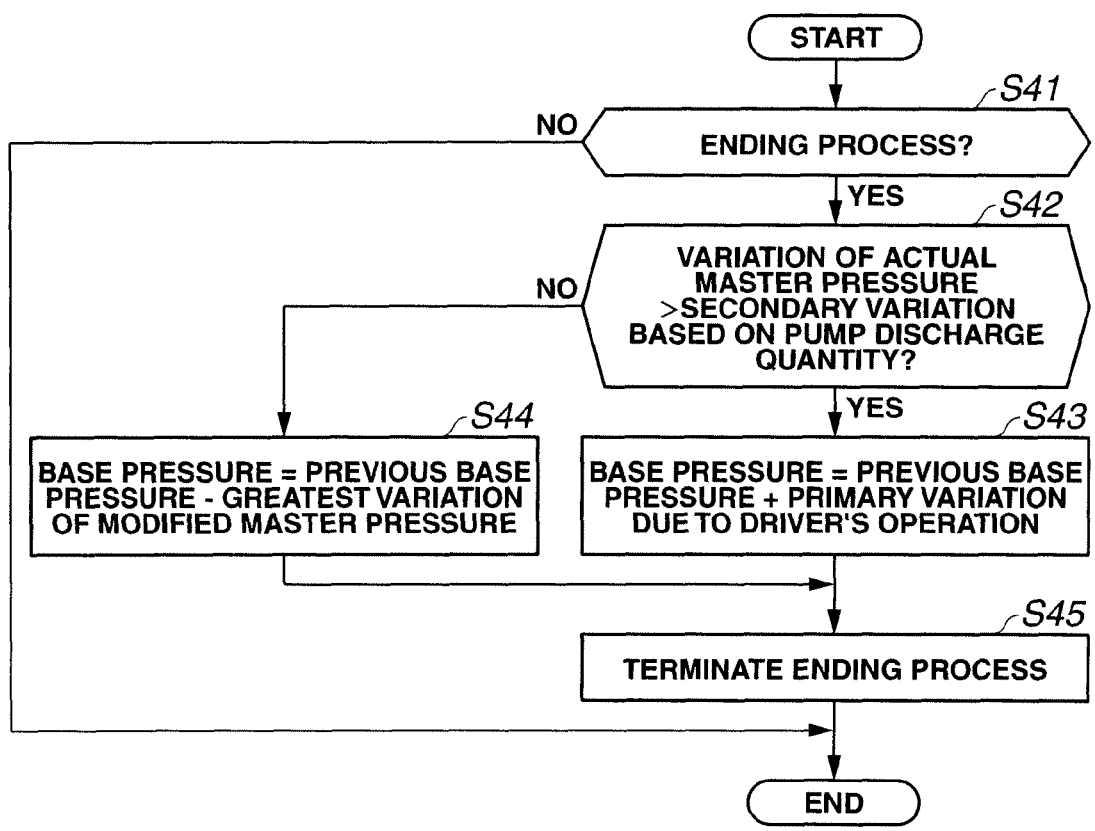
FIG. 7 is a flowchart showing an ending process performed in base pressure calculating section 32b shown in FIG. 3.

[Ending Process] FIG. 7 is a flowchart showing the ending process of S4 performed in base pressure calculating section 32b according to the first embodiment.

At a step S41, ECU 32 examines whether the end (control) flag is set or not. From S41, ECU 32 proceeds to a step S42 in the case of YES, and terminates the process of FIG. 7 in the case of NO. In this example, once the end flag is set at S36, ECU 32 does not enter the section of S32~S38 of FIG. 5, and instead proceeds to step S42 of FIG. 7.

At step S42, ECU 32 examines whether an actual master cylinder pressure variation is greater than a modified master pressure variation due to the pump discharge quantity variation (or pump increase/decrease pressure variation). From S42, ECU 32 proceeds to a step S43 in the case of YES, and to a step S44 in the case of NO. ECU 32 can detect a driver's brake pedal operation of depressing the brake pedal deeper again during a decrease or release of the brake pedal depression, by comparing the variation (increase) of the actual master cylinder pressure (during one control cycle time) with the variation (increase) of the estimate (secondary or unintended) master cylinder pressure variation due to the pump operation (during one control cycle time). When the increase of the actual master cylinder pressure is greater than the variation of the estimated (unintended) master cylinder pressure variation due to the pump operation, then brake ECU 32 judges that the brake pedal is depressed again after a decrease of the brake pedal depression.

At step S43, ECU 32 determines the base pressure by adding a primary (or intended) master cylinder pressure variation due to the driver's brake operation, to the previous base pressure, and proceeds to a step S45. The primary (or intended) master pressure variation is a master cylinder pressure variation attributable to the driver's brake operation whereas the secondary (unintended) master pressure variation is a master cylinder pressure variation attributable to the pump operation. The primary master cylinder pressure variation due to the driver's operation can be determined by subtracting the variation of the estimated secondary (or unintended) master cylinder pressure variation (increase or decrease) based on the pump discharge quantity, from the variation of the actual master cylinder pressure.

[base pressure]=[previous base pressure]+[primary master cylinder pressure variation due to driver's brake operation]

At step S44, ECU 32 determines the base pressure by subtracting, from the previous base pressure, a greatest variation of the modified master cylinder pressure. The greatest variation of the modified master cylinder pressure is a greatest decrease quantity of the modified master cylinder pressure calculated during the ending process. Thus, the base pressure is decreased at a greatest value of the decreasing variation of the modified master cylinder pressure within one control cycle after the start of the ending process. At step S45 following S44 or S44, ECU 32 resets the end (control) flag to zero, and then terminates the process of FIG. 7.

Thus, the brake control system of this embodiment determines the base pressure in a first mode of S35, a second mode of S44 or a third mode of S43 in dependence on the results of the decision (or condition discriminating) steps S32. S33 and S42. In the first mode of S35, the base pressure is increased at the increase rate of the modified master cylinder pressure with respect to time when the answer of S32 is NO and the answer of S33 is YES. In the second mode of S44, the base pressure is decreased, with a decrease of the modified master cylinder pressure, in such a manner as to prevent the decrease rate of the base pressure from being decreased or to hold the decrease rate of the base pressure unchanged even if the decrease rate of the modified master cylinder pressure is decreased or in such a manner as to decrease the base pressure smoothly without being directly influenced by fluctuation of the actual master cylinder pressure and a stepped decrease of the modified master cylinder pressure. The control system determines the base pressure in the first mode to decrease fluctuation of the magnitude of the modified master cylinder pressure, and in the second mode to decrease fluctuation in the decrease rate of the modified master cylinder pressure.

Figure 8:
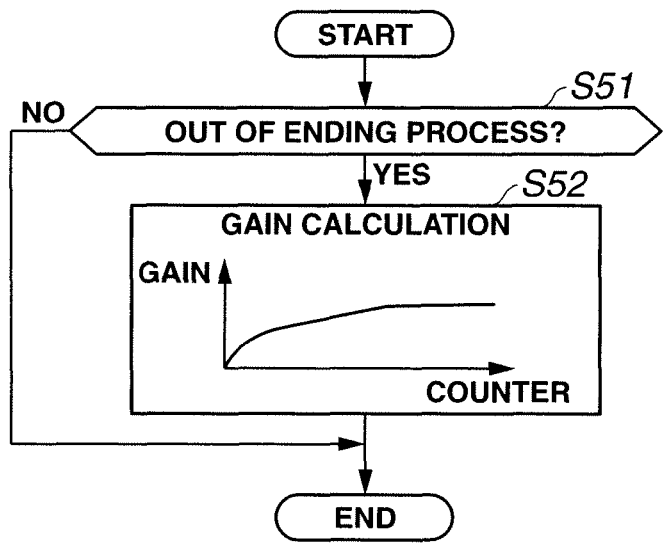
FIG. 8 is a flowchart showing a gain calculating process performed in a target pressure calculating section 32c shown in FIG. 3.

[Gain Calculation] FIG. 8 shows a control flow of a gain calculating process performed in target wheel cylinder pressure calculating section 32c.

At a step S51, ECU 32 examines whether the end flag is set or not. When the end flag is set, ECU 32 terminates the process of FIG. 8. When the end flag is not set, ECU 32 proceeds to a step S52.

At step S52, ECU 32 calculates a gain used for calculating the target wheel cylinder pressure, and then terminates the process of FIG. 8. The brake control system of this example starts the counting of a counter at the time of a start of the brake assist control, and increases the gain as the counter increases. The gain is held at a constant value when the counter exceeds a predetermined counter value. Thus, the gain is increased monotonically with time from the start of the brake assist control.

Figure 9:
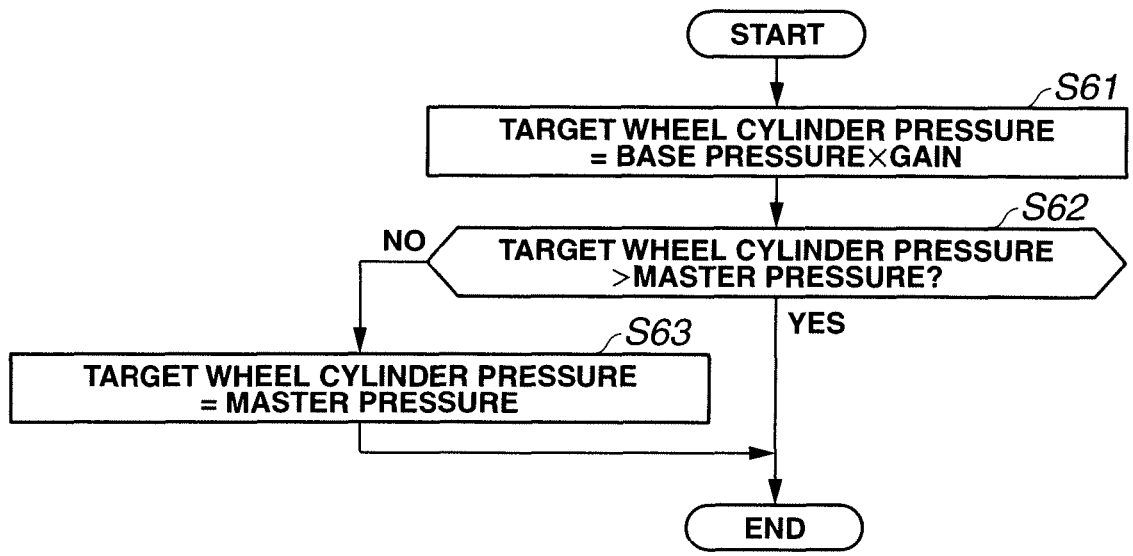
FIG. 9 is a flowchart showing a target pressure calculating process performed in target pressure calculating section of FIG. 3.

[Target Pressure Calculation] FIG. 9 shows a target pressure calculating process performed in target pressure calculating section 32c according to the first embodiment.

At a step S61, ECU 32 determines the target wheel cylinder pressure by multiplying the base pressure determined at S3 or S4, by the gain determined at S5. After S61, ECU 32 proceeds to a step S62.

[target pressure]=[base pressure]×[gain]

Therefore, the target wheel cylinder pressure is increased gradually with passage of time with respect to the base pressure even if the base pressure remains substantially constant.

At step S62, ECU 32 compares the target wheel cylinder pressure determined at S61, with the actual master cylinder pressure, and determines whether the target pressure is higher than the actual master cylinder pressure. When the target pressure is higher than the actual master cylinder pressure, ECU 32 terminates the process of FIG. 9. When the target pressure is lower than or equal to the actual master cylinder pressure, ECU 32 sets the target wheel cylinder pressure equal to the actual master cylinder pressure at a step S63, and then terminates the process of FIG. 9. The target pressure calculating process of FIG. 9 is designed to determine the target pressure by selection of a select-high operation from the target pressure calculated from the base pressure and the actual master cylinder pressure, in order to prevent the target pressure from becoming lower than the actual master cylinder pressure.

The thus-constructed brake control system is operated in the following manner.

[Basic Operation in Brake Assist Control]

Figure 10:
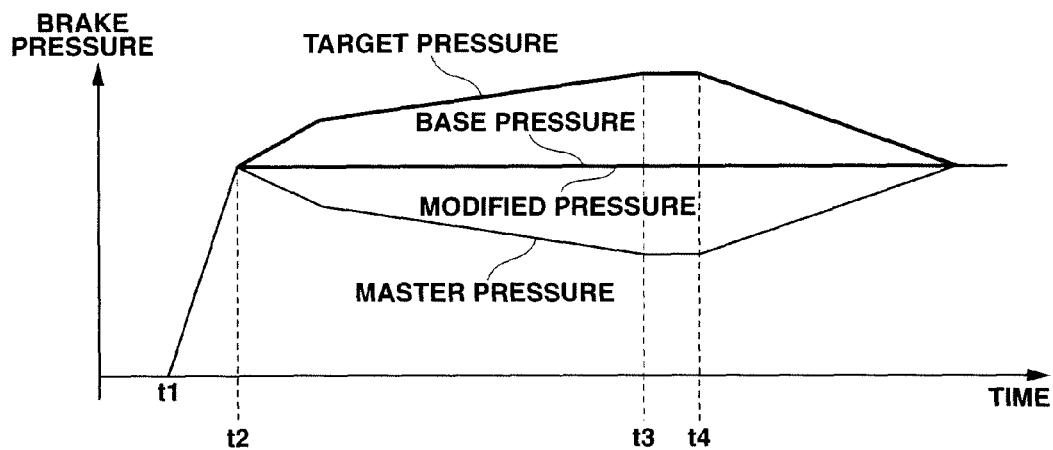
FIG. 10 is a time chart showing variation in the actual master cylinder pressure, modified master cylinder pressure, base pressure and target wheel cylinder pressure according to the first embodiment when a brake pedal BP is depressed constantly by the driver.

(a) [Constant pedal depression] FIG. 10 shows time variation of the sensed actual master pressure (master pressure), the modified master cylinder pressure (modified pressure) and the target wheel cylinder pressure (target pressure) when the driver depresses brake pedal BP and holds brake pedal BP at a constant depression degree.

At a time point t1 in FIG. 10, the driver starts depression of brake pedal BP. At a time point t2, the brake operation quantity (or depression degree) becomes constant. Therefore, the brake control system starts the buildup control as the brake assist control at t2. In the brake assist control, the control flow is S1→S2→S3→S4→S5→S6 in the flowchart of FIG. 3. In this brake assist control, the control system drives the pump P in accordance with the target wheel cylinder pressure. Therefore, the brake fluid is drained from master cylinder M/C with a drive quantity of pump P corresponding to the target wheel cylinder pressure, and the brake fluid is supplied to wheel cylinder(s) W/C. Therefore, the actual master cylinder pressure decreases with increase in the target wheel cylinder pressure. In the base pressure calculating process of FIG. 5, in this case, the control flow is S31→S32→S34→S37, and the base pressure is held constant.

At a time point t3 when a predetermined time interval has elapsed from the start of the brake assist control (when the counter becomes equal to or greater than a predetermined value), the target wheel cylinder pressure is stopped from increasing, and held constant from t3. At a time point t4, the vehicle speed becomes lower than or equal to a low vehicle speed threshold, and the condition to perform the brake assist control becomes unsatisfied. Therefore, the answer of step S2 shown in FIG. 4 becomes negative, and hence the brake control system terminates the brake assist control in the flowchart of FIG. 4, and opens the gate out valve 3. As a result, the brake fluid returns from wheel cylinder W/C to master cylinder M/C, and the actual master cylinder pressure is returned (increased) gradually to the value corresponding to the driver's operation.

Figure 11:
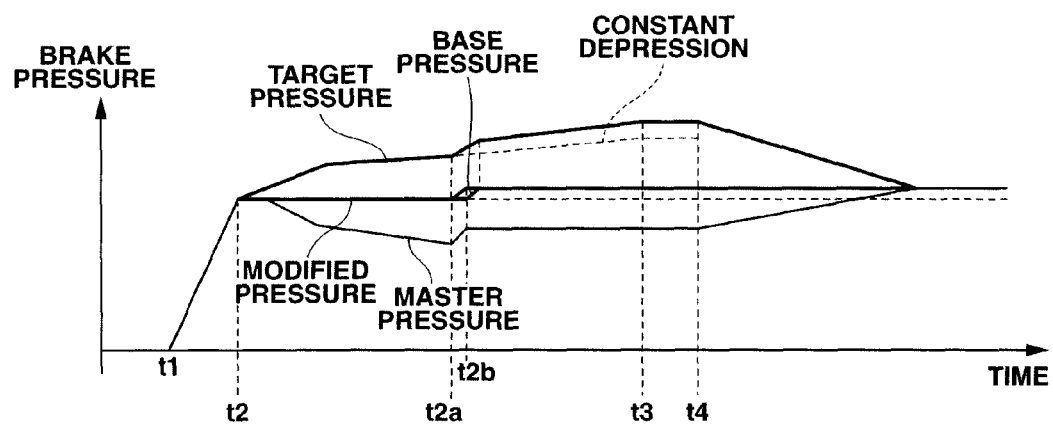
FIG. 11 is a time chart showing variation in the actual master cylinder pressure, modified master cylinder pressure, base pressure and target wheel cylinder pressure according to the first embodiment when brake pedal BP is depressed deeper from a constant depression state.

(b) [Increase in pedal depression from constant depression] FIG. 11 shows time variation of the actual master cylinder pressure, the modified master cylinder pressure and the target wheel cylinder pressure when the driver depresses brake pedal BP further (deeper) (and thereby increases the brake pedal depression degree) from a constant depression state.

The driver starts depressing the brake pedal BP at t1, and starts a constant depression operation at t2 in the same manner as in the constant depression of FIG. 10. At a time point t2*a* shown in FIG. 11, the driver depresses the brake pedal deeper. Therefore, the actual master cylinder pressure is increased and the modified master cylinder pressure is increased together. However, the absolute value of the deviation between the base pressure and the modified master cylinder pressure is still lower than the base pressure variation threshold. Consequently, the control flow in the base pressure calculating process of FIG. 5 is S31→S32→S34→S37, and the base pressure is held constant.

At a time point t2*b*, the absolute value of the deviation between the base pressure and the modified master cylinder pressure becomes greater than or equal to the base pressure variation threshold. Consequently, the control flow in the base pressure calculating process of FIG. 5 is S31→S32→S33→S35, and the base pressure is increased by an amount corresponding to the increase of the modified master cylinder pressure. Thereafter, the target wheel cylinder pressure is increased gradually with respect to the constant base pressure, in the same manner in the control of FIG. 10.

Figure 12:
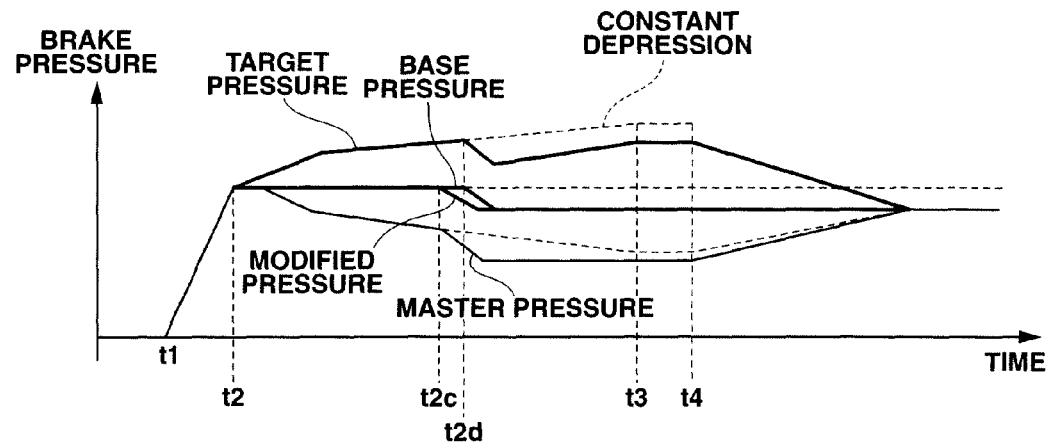
FIG. 12 is a time chart showing variation in the actual master cylinder pressure, modified master cylinder pressure, base pressure and target wheel cylinder pressure according to the first embodiment when brake pedal BP is returned slightly from the constant depression state.

(c) [Decrease in pedal depression from constant depression] FIG. 12 shows time variation of the actual master cylinder pressure, the modified master cylinder pressure and the target wheel cylinder pressure when the driver returns brake pedal BP (decreases the depression degree) from the constant depression state.

The driver starts depressing brake pedal BP at t1, and starts a constant depression operation at t2 in the same manner as in the constant depression of FIG. 10. At a time point t2*c* shown in FIG. 12, the driver decreases the brake pedal depression by returning the brake pedal. Therefore, the actual master cylinder pressure is decreased from the level of the constant depression and the modified master cylinder pressure is also decreased with decrease of the actual master cylinder pressure. However, the absolute value of the deviation between the base pressure and the modified master pressure is smaller than the base pressure variation threshold. Consequently, the control flow in the base pressure calculating process of FIG. 5 is S31→S32→S34→S37, and the base pressure is held constant.

At a time point t2*d*, the absolute value of the deviation between the base pressure and the modified master cylinder pressure becomes greater than or equal to the base pressure variation threshold. Consequently, the control flow in the base pressure calculating process of FIG. 5 is S31→S32→S33→S36→S37, the end flag is set (at S36), and accordingly the ending control is performed at S4 of FIG. 4. In the ending control process of FIG. 7, the control flow is S41→S42→S43→S44→S45. Accordingly, the base pressure is decreased by an amount corresponding to a variation of the master cylinder pressure due to the driver's operation, and the base pressure becomes equal to the modified master pressure. Thereafter, the target wheel cylinder pressure is increased gradually with respect to the constant base pressure in the same manner in the control of FIG. 10.

[Step formed in target pressure at the time of decrease of target pressure] When the target pressure is to be increased in the brake assist control, the brake control system closes the gate-out valve 3, opens the gate-in valve 2, and drives pump P in accordance with the target pressure. Therefore, pump P sucks the brake fluid from master cylinder M/C through fluid passage 11, and supplies the pressurized brake fluid to wheel cylinder W/C through fluid passage 12.

In this case, the actual master cylinder pressure decreases in accordance with the pressure increase quantity of pump P or the discharge quantity of pump P. Therefore, the actual master cylinder pressure sensed by the master cylinder pressure sensor deviates from the value corresponding to the driver's brake operation quantity, and hence the control system is unable to reflect the driver's brake operation adequately on the target pressure. Therefore, the brake control system disclosed in the before-mentioned Published Japanese Patent Application Pub. No. 11-20638 is aimed to achieve the brake assist control reflecting the driver's brake operation, by modification with a decrease of the master cylinder pressure not caused by the driver's brake operation.

However, this brake control system does not take, into consideration, an increase of the master cylinder pressure due to the brake fluid returned from the wheel cylinder to the master cylinder, without relation to the driver's brake operation, in the hydraulic circuit arranged to return the brake fluid of the wheel cylinder directly to the master cylinder at the time of decrease of the target pressure in the brake assist control. Without taking account of this increase of the master cylinder pressure, the brake control system cannot achieve the brake assist control reflecting the driver's brake operation adequately.

[Preventing a step in target pressure] When the driver decreases the brake operation quantity, the brake control system according to the first embodiment, by contrast, decreases the base pressure at a greatest decreasing rate of the modified master cylinder pressure calculated during the driver's operation to decrease the brake operation quantity, without regard to the variation quantities of the master pressure and modified master pressure.

Namely, in the base pressure calculating process of FIG. 5, when the absolute value of the deviation between the base pressure and the modified master cylinder pressure exceeds the base pressure variation threshold, the brake control system takes the course of S31→S32→S33→S36, and starts the ending process of FIG. 7. In the ending process of FIG. 7, the brake control system takes the course of S41→S42→S44→S45, and sets the base pressure equal to the difference obtained by subtracting the greatest value of the modified master cylinder pressure variation from the previous base pressure, at S44.

Figure 13:
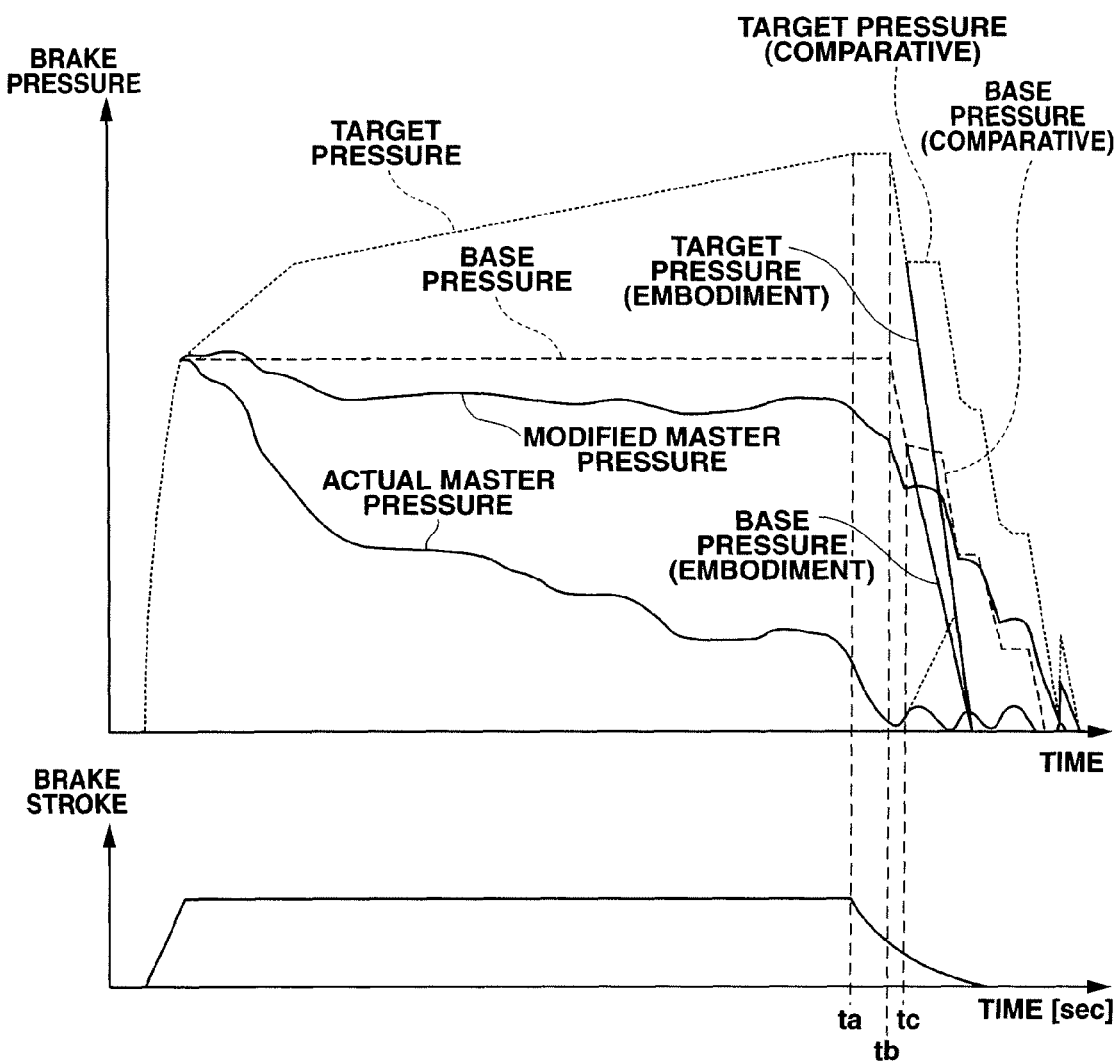
FIG. 13 is a time chart of the actual master cylinder pressure, modified master cylinder pressure, base pressure and target wheel cylinder pressure for illustrating operation of the control system according to the first embodiment.

FIG. 13 shows one example of the control of the first embodiment in the form of a time chart of the actual master cylinder pressure, modified master cylinder pressure, base pressure and target wheel cylinder pressure, in comparison with a comparative example without employing the control of the first embodiment.

At a time point ta, the driver starts a returning operation to decrease the pedal depression. Therefore, the brake control system connects the master cylinder M/C and wheel cylinder W/C through fluid passage 13, by closing gate-in valve 2 and opening gate-out valve 3, and thereby returns the brake fluid from wheel cylinder W/C to master cylinder M/C. As a result, the master pressure starts decreasing, and the modified master pressure follows.

At a time point tb, the absolute value of the deviation between the base pressure and the modified master pressure exceeds the base pressure variation threshold. Therefore, the base pressure starts decreasing. During an interval between time point tb and a next time point tc, the actual master cylinder pressure is increased by the brake fluid returned from wheel cylinder W/C to master cylinder M/C.

At time point tc, the modified master cylinder pressure is increased with the increase of the actual master cylinder pressure, and the absolute value of the deviation between the base pressure and the modified master cylinder pressure becomes smaller than the base pressure variation threshold. Therefore, the base pressure is held (base pressure (comparative)) notwithstanding the continuation of decrease of the brake stroke. Accordingly, the target pressure is also held (target pressure (comparative)). However, since the driver continues the returning operation of brake pedal BP, the actual master cylinder pressure starts decreasing again, and the base pressure is decreased and held repeatedly. Consequently, there are formed steps in the target pressure as shown by a broken line showing the comparative example (target pressure (comparative)), and these steps cause changes of the braking force, and deteriorate the pedal feeling.

When the absolute value of the deviation between the base pressure and the modified master pressure exceeds the base pressure variation threshold at time point tb, the brake control system of the first embodiment, by contrast, judges that the brake operation quantity is decreased by the driver, shifts to the ending control, and decreases the base pressure at the greatest decrease rate of the modified master cylinder pressure. Therefore, the control system of the first embodiment can prevent a step from being produced in the target pressure, and deterioration of the pedal feeling, and provide proper performance of the brake assist control conforming to the driver's brake operation.

Moreover, by checking a decrease of the brake operation quantity by the use of the base pressure variation threshold, the control system can avoid misjudgment of regarding a variation of the modified master pressure due to pulsation of pump P, wrongly as a decrease of the brake operation quantity. The control system of the first embodiment can detect a decrease of the driver's brake operation quantity accurately without being hampered by the pulsation of pump P.

Figure 14:
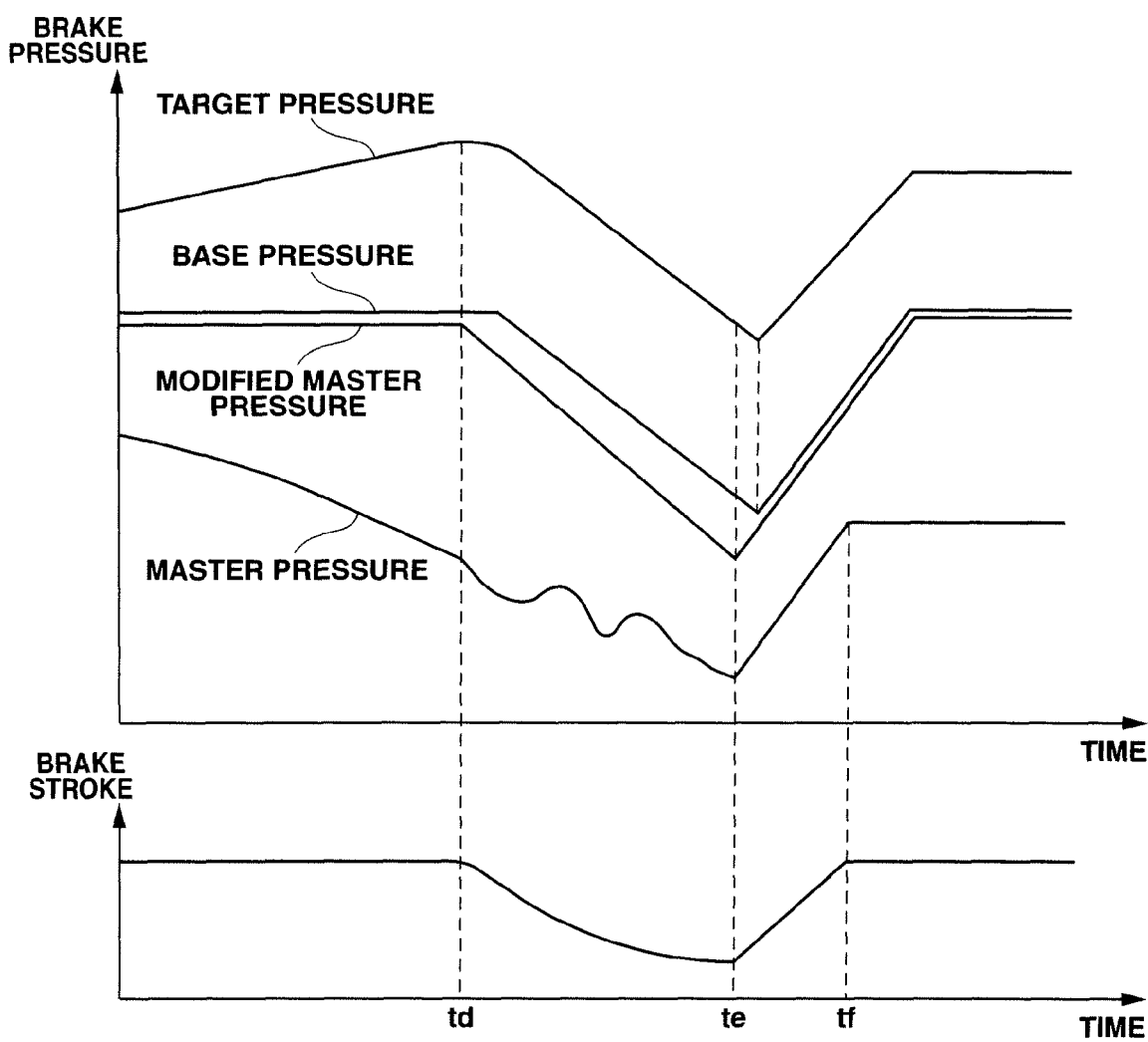
FIG. 14 is a time chart of the actual master cylinder pressure, modified master cylinder pressure, base pressure and target wheel cylinder pressure for illustrating operation of the control system according to the first embodiment when the brake pedal BP is depressed again during the ending process.

[Return to brake assist control by subsequent pedal depression] FIG. 14 is a time chart of the actual master cylinder pressure, modified master cylinder pressure, base pressure and target pressure for illustrating operations of the control system according to the first embodiment when the brake pedal BP is depressed again by the driver during the ending process. At a time point td, since the driver starts a brake pedal returning operation to decrease the brake operation quantity, the absolute value of the deviation between the estimated master pressure and the base pressure exceeds the base pressure variation threshold, and the control system starts the ending control. In the ending process of FIG. 7, the control flow is S41→S42→S44→S45.

At a time point te, the brake pedal BP is depressed again by the driver. Therefore, the increase of the master cylinder pressure becomes greater than the variation of the modified master cylinder pressure based on the variation (increase or decrease) of the pump pressure, and the control system takes the course of S41→S42→S43→S45 in the ending process of FIG. 7. At step S43, the base pressure is set equal to the sum of the previous base pressure and the component of the modified master cylinder pressure variation, attributable to the driver's brake operation. Therefore, the base pressure increases in accordance with the modified master cylinder pressure. Thus, when the brake operation quantity is increased by the driver after an operation to decrease the brake operation quantity, the control system according to the first embodiment calculates the base pressure in accordance with the previous base pressure and the variation due to the driver's operation of the modified master cylinder pressure variation. Therefore, the control system can restart the brake assist control smoothly in response to a driver's brake pedal depression during the ending control process.

After the driver's operation of decreasing the brake operation quantity, the control system detects the driver's operation of increasing the brake operation quantity again by comparing the variation quantity of the actual master cylinder pressure with the variation quantity of the modified master cylinder pressure (at S42). Therefore, the control system can accurately detect the driver's operation of increasing the brake operation quantity again.

At a time point tf, the base pressure is held constant by the control flow of S31→S32→S34→S37 in FIG. 5 because the brake stroke becomes constant.

The thus-constructed brake control system according to the first embodiment can provide the following effects or advantages.

(1) Brake ECU 32 takes into consideration or compensates for the master cylinder pressure variation caused by a return of the brake fluid from wheel cylinder W/C to master cylinder M/C), and performs the brake assist control by using the result of the compensation. Therefore, even in the case of an unintended increase of the master cylinder pressure after a driver's operation to return the brake pedal, the control system can perform the brake assist control reflecting the driver's brake operation.

(2) Brake ECU 32 includes: the modified master cylinder pressure calculating section 32a for calculating the estimated (secondary) master cylinder pressure variation in accordance with the discharge quantity (or pressure increase quantity) of the pump and for calculating the modified (or estimated) master cylinder pressure in accordance with the actual master cylinder pressure and the estimated (secondary) master cylinder pressure variation; the base pressure calculating section 32b for calculating the base pressure representing a driver's brake operation quantity, in accordance with the actual master cylinder pressure at the time of a start of the brake assist control and the variation of the modified master cylinder pressure (per unit time such as cycle time); and the target wheel cylinder pressure calculating section 32c for calculating the target wheel cylinder pressure in accordance with the base pressure instead of calculating the target pressure directly from the modified master cylinder pressure. Therefore, the brake control system can perform the brake assist control stably by restraining pulsating fluctuation of the master pressure caused by the pump operation in returning the fluid pressure of the wheel cylinder to the master cylinder during the brake assist control, by the use of the variation of the modified master pressure.

(3) The base pressure calculating section 32b decreases the base pressure at a controlled decreasing rate, without regard to variation of the actual master cylinder pressure and variation of the modified master cylinder pressure, when the driver's brake operation quantity is decreased. Specifically in the illustrated example, the base pressure calculating section 32b decreases the base pressure at the greatest decreasing rate of the modified master pressure calculated during a decrease of the driver's brake operation quantity. Therefore, even in the event of an unintended master cylinder pressure increase not attributable to the driver's operation during a brake pedal returning operation, the brake control system can prevent undesired steps in the target pressure, or undesired fluctuation in the decrease rate of the target pressure, and deterioration of the brake pedal feeling, and achieve the brake assist control properly following the driver's brake operation.

(4) The base pressure calculating section 32b detects a decrease of the driver's brake operation quantity by comparing the deviation between the base pressure and the modified master cylinder pressure with the base pressure variation threshold. Therefore, the brake control system can detect the decrease of the driver's brake operation quantity accurately without receiving interference from pulsation of the pump.

(5) When the driver's brake operation quantity is increased again after a decrease of the brake operation quantity, the base pressure calculating section 32b calculates the base pressure by using the first or primary (or intended) component of the variation of the modified master cylinder pressure which is a variation due to the driver's brake operation. Therefore, the control system can restart the brake assist control smoothly if the brake pedal is depressed further during the ending control.

Although the invention has been described above by reference to the first embodiment of the invention, the invention is not limited to the embodiment described above. Various modifications and variations of the embodiment described above are possible within the purview of the present invention.

Figure 15:
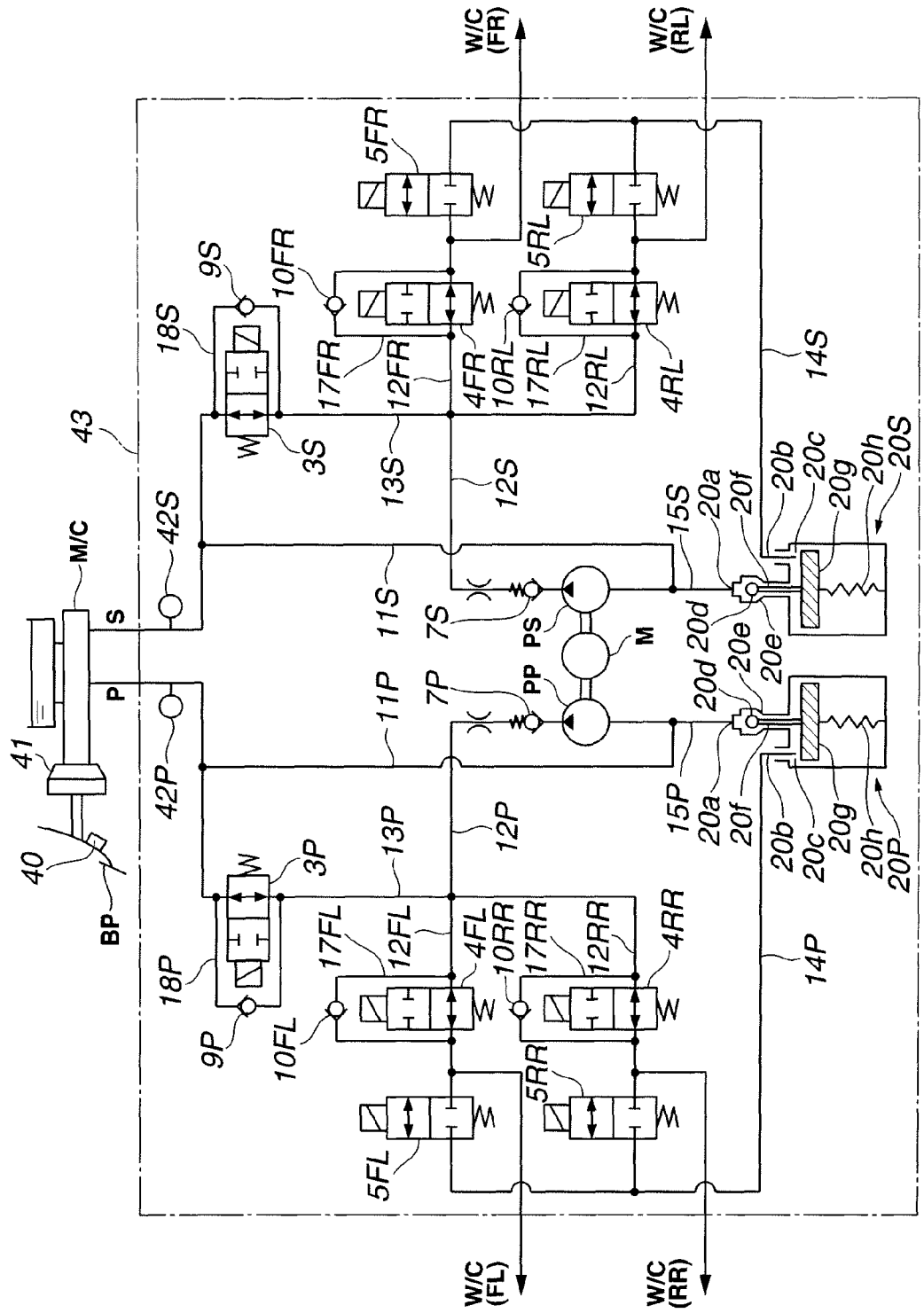
FIG. 15 is a hydraulic circuit diagram showing a hydraulic unit according to another embodiment.

For example, the hydraulic unit is not limited to the structure shown in FIG. 2. FIG. 15 shows another example of the hydraulic unit substituting for FIG. 2. The hydraulic unit 43 shown in FIG. 15 is different from the hydraulic unit 31 of FIG. 2 in that the reservoir 16 (16P, 16S) is replaced by a reservoir 20 (20P, 20S) and the gate-in valve 2 (2P, 2S) and the check valves 6 (6P, 6S) and 8 (8P, 8S) are eliminated.

The reservoir 20 includes a first reservoir opening 20a connected with the fluid passage 15 and arranged to receive the brake fluid from master cylinder M/C, a second reservoir opening 20b connected with the fluid passage 14 and arranged to receive the brake fluid from the wheel cylinder W/C and to supply the brake fluid to the inlet port of the pump P, and a reservoir chamber 20c into which first and second openings 20a and 20b are opened. A ball valve 20d is disposed on the inner side of first opening 20a, and a rod 20f in the form of a member separate from ball valve 20d is arranged to move ball valve 20d up and down within a limited stroke.

A piston 20g is disposed in the reservoir chamber 20c. Piston 20g is connected with rod 20f so that the piston 20g and rod 20f move together. A spring 20h is disposed in reservoir chamber 20c and arranged to push the piston 20g toward ball valve 20d and thereby to produce a force urging the brake fluid out of reservoir chamber 20c.

In the thus-constructed reservoir 20, the ball valve 20d rests on a valve seat 20e to prevent further inflow of the brake fluid into reservoir chamber 20c when the amount of the brake fluid stored in the reservoir 20 reaches a predetermined value. Thus, the reservoir 20 is arranged to prevent the brake fluid from flowing into the reservoir chamber 20c beyond the sucking ability of pump P, and thereby to prevent the pressure applied on the inlet side of pump P from becoming too high.

In the normal control operation of hydraulic unit 43 in which pump P is not driven, the ball valve 20d abuts on the valve seat 20e because of the master cylinder pressure, and thereby causes the brake fluid to be supplied to the wheel cylinder W/C without being stored in the reservoir 20.

In the brake assist control (buildup control), the brake control system closes the gate-out valve 3 and drives the pump P in the case to increase the wheel cylinder pressure. In this state, the brake fluid is sucked from master cylinder M/C by the pump P and supplied to the wheel cylinder W/C through fluid passage 12. In the case to decrease the wheel cylinder pressure, on the other hand, the brake control system stops the pump P and opens the gate-out valve 3, so that the brake fluid is returned from the wheel cylinder W/C through fluid passage 13 to master cylinder M/C. Therefore, the brake control system employing the hydraulic unit 43 shown in FIG. 15 can also perform the brake assist control and provide the same effects as in the first embodiment.

According to the illustrated embodiments of the present invention, a brake control system comprises: a master cylinder (M/C), at least one wheel cylinder (W/C), a hydraulic unit or modulator connected between the master cylinder and the wheel cylinder, a fluid pressure sensor to sense an actual master cylinder pressure, and a (brake assist) controller. The master cylinder is arranged to produce a master cylinder pressure in accordance with a driver's brake input (operation quantity). The wheel cylinder is arranged to produce a braking force by receiving a wheel cylinder pressure; and the hydraulic modulator is arranged to produce the wheel cylinder pressure by regulating the master cylinder pressure supplied from the master cylinder. The hydraulic unit or modulator includes a pressure source (such as a pump) to increase the wheel cylinder pressure beyond the master cylinder pressure produced by the master cylinder, and a hydraulic circuit section connecting the master cylinder and the wheel cylinder. In the illustrated examples of FIG. 2 and FIG. 15, the hydraulic circuit section includes at least a first circuit segment or fluid passage (11) extending from a first junction point connected with the master cylinder to the inlet side of the pump (P), a gate valve (3) disposed in a second circuit segment or fluid passage (13) extending from the first junction point to a second junction point connected with the outlet side of the pump (P), a pressure increase valve (4) disposed between the second junction point and a third junction point connected with the wheel cylinder (W/C), a pressure decrease valve (5) disposed in a return circuit segment (14) extending from the third junction point to a reservoir (16, 20) which is connected with the inlet side of the pump (P).

According to one aspect of the present invention, a brake control apparatus comprises: a fluid pressure sensor to produce a sensor signal representing an actual master cylinder pressure of a master cylinder; a pump to suck a brake fluid from the master cylinder through a hydraulic circuit connecting the master cylinder to a wheel cylinder; and a brake assist controlling means for performing a brake assist control to supply a discharge pressure of the pump to the wheel cylinder and to return the brake fluid from the wheel cylinder to the master cylinder through the hydraulic circuit, in accordance with the sensor signal. The brake assist controlling means (or brake assist controlling process) includes (i) an estimating means (or step) for calculating an estimated master cylinder pressure variation due to a pump operation in accordance with a discharge fluid quantity of the pump, (ii) a modifying means (or step) for calculating a modified master cylinder pressure in accordance with the actual master cylinder pressure and the estimated master cylinder pressure variation due to the pump operation, (iii) a base pressure calculating means (or step) for calculating a base pressure in accordance with the actual master cylinder pressure and the variation of the modified master cylinder pressure, (iv) a target pressure calculating means (or step) for calculating a target wheel cylinder pressure in accordance with the base pressure, and (v) a drive controlling means (or step) for controlling the pump in accordance with the target wheel cylinder pressure to control the braking force by controlling an actual wheel cylinder pressure of the wheel cylinder. The base pressure calculating means (or step) may comprise a discriminating means (or a substep) for determining whether the modified master cylinder pressure is increased or decreased, to cause the base pressure to be varied in an increasing mode when the modified master cylinder pressure is increased, and in a decreasing mode when the modified master cylinder pressure is decreased, a base pressure increasing means (or substep) for increasing the base pressure with increase of the modified master cylinder pressure in the increasing mode to reduce fluctuation in the modified master cylinder pressure, and a base pressure decreasing means (or substep) for decreasing the base pressure with decrease of the modified master cylinder pressure in the decreasing mode to prevent a decrease rate of the base pressure from being fluctuated by fluctuation of a decrease rate of the modified master cylinder pressure.

This application is based on a prior Japanese Patent Application No. 2007-265082 filed on Oct. 11, 2007, and a prior Japanese Patent Application No. 2008-158593 filed on Jun. 18, 2008. The entire contents of these Japanese Patent Applications No. 2007-265082 and No. 2008-158593 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus comprising:
a fluid pressure sensor to produce a sensor signal representing an actual master cylinder pressure of a master cylinder;
a pump to suck a brake fluid from the master cylinder through a hydraulic circuit connecting the master cylinder to a wheel cylinder; and
a controller to perform a brake assist control to supply a discharge pressure of the pump to the wheel cylinder and to return the brake fluid from the wheel cylinder to the master cylinder through the hydraulic circuit, in accordance with the sensor signal, the controller being configured,
to calculate a modified master cylinder pressure by modifying the actual master cylinder pressure in accordance with an operating condition of the pump,
to calculate a base pressure to represent a driver's brake operation quantity, in accordance with a variation of the modified master cylinder pressure, and
to calculate a target wheel cylinder pressure in accordance with the base pressure, to control a braking force by controlling an actual wheel cylinder pressure of the wheel cylinder in accordance with the target wheel cylinder pressure.

2. The brake control apparatus as claimed in claim 1, wherein the controller is configured to calculate an estimated master cylinder pressure variation due to pump operation in accordance with a discharge quantity of the pump, to calculate the modified master cylinder pressure in accordance with the actual master cylinder pressure and the estimated master pressure variation due to the pump operation, to calculate the base pressure representing the driver's brake operation quantity in accordance with the actual master cylinder pressure at a time of a start of the brake assist control and the variation of the modified master cylinder pressure which is a time variation of the modified master cylinder pressure, to calculate the target wheel cylinder pressure in accordance with the base pressure, and to control the braking force by controlling the actual wheel cylinder pressure of the wheel cylinder in accordance with the target wheel cylinder pressure.

3. The brake control system as claimed in claim 1, wherein the controller is configured to calculate a modification quantity to compensate for an estimated master cylinder pressure variation due to pump operation in accordance with a discharge quantity of the pump, to calculate the modified master cylinder pressure from the actual master cylinder pressure and the modification quantity, and to vary the base pressure in accordance with the variation of the modified master cylinder pressure.

4. The brake control apparatus as claimed in claim 1, wherein the controller is configured to decrease the base pressure at a greatest decreasing rate of the modified master pressure calculated during a decrease of the driver's brake operation quantity when the driver's brake operation quantity is decreased.

5. The brake control apparatus as claimed in claim 4, wherein the controller is configured to judge that the driver's brake operation quantity is decreased when a deviation between the base pressure and the modified master cylinder pressure is greater than or equal to a predetermined base pressure variation threshold.

6. The brake control apparatus as claimed in claim 4, wherein the controller is configured to calculate a current value of the base pressure in accordance with a previous value of the base pressure, and a first component of the variation of the modified master cylinder pressure when the brake operation quantity is increased again by the driver after the decrease of the brake operation quantity, the first component of the variation of the modified master cylinder pressure being a variation corresponding to a driver's brake operation.

7. The brake control apparatus as claimed in claim 6, wherein the controller is configured to detect a driver's operation of increasing the brake operation quantity again after the decrease of the brake operation quantity when a variation of the actual master cylinder pressure becomes greater than the variation of the modified master cylinder pressure after the decrease of the brake operation quantity.

8. The brake control apparatus as claimed in claim 1, wherein the controller is configured to compare the target wheel cylinder pressure calculated in accordance with the base pressure, with the actual master cylinder pressure, and to select a higher one of the target wheel cylinder pressure based on the base pressure and the actual master cylinder pressure, as a final target pressure.

9. The brake control apparatus as claimed in claim 1, wherein the controller is configured to perform a build-up control of increasing the target wheel cylinder pressure gradually with time.

10. The brake control apparatus as claimed in claim 1, wherein the controller is configured to calculate the base pressure in accordance with the variation of the modified master cylinder pressure so as to decrease fluctuation of the modified master cylinder pressure.

11. The brake control apparatus as claimed in claim 1, wherein the controller is configured to decrease the base pressure with a decrease of the modified master cylinder pressure, and to hold the decrease rate of the base pressure even if a decrease rate of the modified master cylinder pressure is decreased.

12. The brake control apparatus as claimed in claim 1, wherein the controller is configured to hold the base pressure unchanged unless a deviation between the base pressure and the modified master cylinder pressure exceeds a base pressure variation threshold, and to vary the base pressure in accordance with the variation of the modified master cylinder pressure when the deviation between the base pressure and the modified master cylinder pressure exceeds the base pressure variation threshold.

13. The brake control apparatus as claimed in claim 12, wherein the controller is configured to increase the base pressure by addition of the variation of the modified master cylinder pressure to a previous value of the base pressure when the modified master cylinder pressure is increased, and to decrease the base pressure by subtraction of the variation of the modified master cylinder pressure from the previous value of the base pressure when the modified master cylinder pressure is decreased.

14. The brake control apparatus as claimed in claim 3, wherein the controller is configured to determine the base pressure by addition of a previous value of the base pressure and a remainder remaining after subtraction of the variation of the estimated master cylinder pressure variation due to the pump operation, from a variation of the actual master cylinder pressure when the variation of the actual master cylinder pressure is greater than the variation of the estimated master cylinder pressure variation due to the pump operation.

15. A brake control process for controlling a braking force with a pump to suck a brake fluid from a master cylinder through a hydraulic circuit connecting the master cylinder to a wheel cylinder, by performing a brake assist control to supply a discharge pressure of the pump to the wheel cylinder and to return the brake fluid from the wheel cylinder to the master cylinder through the hydraulic circuit, in accordance with a sensed actual master cylinder pressure, the brake control process comprising;
calculating a modified master cylinder pressure by modifying the actual master cylinder pressure in accordance with an operating condition of the pump;
calculating a base pressure to represent a driver's brake operation quantity, in accordance with and a variation of the modified master cylinder pressure; and
calculating a target wheel cylinder pressure in accordance with the base pressure, to control the braking force by controlling an actual wheel cylinder pressure of the wheel cylinder in accordance with the target wheel cylinder pressure.

16. A brake control apparatus comprising:
a fluid pressure sensor to produce a sensor signal representing an actual master cylinder pressure of a master cylinder;
a pump to suck a brake fluid from the master cylinder through a hydraulic circuit connecting the master cylinder to a wheel cylinder; and
a brake assist controlling means for performing a brake assist control to supply a discharge pressure of the pump to the wheel cylinder and to return the brake fluid from the wheel cylinder to the master cylinder through the hydraulic circuit, in accordance with the sensor signal, the brake assist controlling means including,
an estimating means for calculating an estimated master cylinder pressure variation due to a pump operation in accordance with a discharge fluid quantity of the pump,
a modifying means for calculating a modified master cylinder pressure in accordance with the actual master cylinder pressure and the estimated master cylinder pressure variation due to the pump operation,
a base pressure calculating means for calculating a base pressure in accordance with the actual master cylinder pressure and the variation of the modified master cylinder pressure,
a target pressure calculating means for calculating a target wheel cylinder pressure in accordance with the base pressure, and
a drive controlling means for controlling the pump in accordance with the target wheel cylinder pressure to control the braking force by controlling an actual wheel cylinder pressure of the wheel cylinder.

17. The brake control apparatus as claimed in claim 16, wherein the base pressure calculating means comprises a discriminating means for determining whether the modified master cylinder pressure is increased or decreased, to cause the base pressure to be varied in an increasing mode when the modified master cylinder pressure is increased, and in a decreasing mode when the modified master cylinder pressure is decreased, a base pressure increasing means for increasing the base pressure with increase of the modified master cylinder pressure in the increasing mode to reduce fluctuation in the modified master cylinder pressure, and a base pressure decreasing means for decreasing the base pressure with decrease of the modified master cylinder pressure in the decreasing mode to prevent a decrease rate of the base pressure from being fluctuated by fluctuation of a decrease rate of the modified master cylinder pressure.

* * * * *